United States Patent Office 3,847,865
Patented Nov. 12, 1974

---

3,847,865
USE OF ALUMINA TRIHYDRATE IN A POLY-
METHYL METHACRYLATE ARTICLE
Ray B. Duggins, Chadds Ford, Pa., assignor to E. I. du
Pont de Nemours and Company, Wilmington, Del.
No Drawing. Continuation-in-part of application Ser. No.
248,577, Apr. 28, 1972, which is a continuation-in-part
of application Ser. No. 3,524, Jan. 16, 1970, both now
abandoned. This application Sept. 26, 1973, Ser. No.
401,074
Int. Cl. C08f 45/04
U.S. Cl. 260—42.52                                   1 Claim

ABSTRACT OF THE DISCLOSURE

Disclosed herein is a filled polymethyl methacrylate article containing 20–85% by weight alumina trihydrate as a filler, which due to its translucency, low flame spread index and increased resistance to stress cracking and acid etching compared to other filled plastics is particularly useful as a building product.

CROSS-REFERENCE TO RELATED APPLICATIONS

This application is a continuation-in-part of copending U.S. patent application Ser. No. 248,577, filed Apr. 28, 1972, now abandoned, which is a continuation-in-part of U.S. patent application Ser. No. 3,524, filed on Jan. 16, 1970, now abandoned.

BACKGROUND OF THE INVENTION

Field of the invention

This invention relates to filled polymers. More specifically, it relates to articles of polymeric methyl methacrylate containing alumina trihydrate, which due to their increased translucency, low flame spread characteristics and increased resistance to stress cracking and acid etching compared to other filled plastics, are particularly well suited for use as building products.

Discussion of the prior art

Filled plastics and various methods for their manufacture constitute a well-developed art. Specifically, articles of manufacture comprising polymeric methyl methacrylate and a filler selected from a group of materials including alumina is disclosed in U.S. Pat. Re. 27,093. In the context of a filler for polymeric methyl methacrylate, however, the term "alumina" refers to $Al_2O_3$, commonly called calcined alumina; and "alumina" from which the water of hydration has been removed. The use of alumina trihydrate as a filler in laminated polyester structures containing a small amount of an acrylic polymer less than 10% by weight, is disclosed in U.S. Pat. 3,189,513. The alumina trihydrate is used to produce desirable electrical insulating properties. Finally, the use of alumina trihydrate in polyesters to impart flame resistance is disclosed in an article by Connolly and Thornton in Modern Plastics 43, 154 (1965). As used in polyesters, however, alumina trihydrate is a non-functional filler which acts to substantially the same degree as any other filler.

None of these references disclose the use of alumina trihydrate filler in an acrylic polymer, nor do they suggest that where used in acrylics, alumina trihydrate is a multifunctional filler which imparts a variety of advantageous properties to the structure.

SUMMARY OF THE INVENTION

I have discovered that the use of 20 to 85%, preferably about 55 to about 80%, by weight of alumina trihydrate, as a filler in acrylic polymers produces a structure with a combination of properties such as translucency, weather resistance, flame resistance, resistance to stress cracking and resistance to staining or etching by common household acids and bases that makes the structure uniquely suited for a building product.

The use of alumina trihydrate as a filler in acrylic polymers gives rise to a structure with a translucency that far exceeds that of acrylic structures filled with other materials such as calcium carbonate or alumina. As such, in thin sheets, the structure is particularly useful as a lighting panel or similar structure where translucency is necessary or desirable. When alumina trihydrate is incorporated into a pigmented structure with a variegated pattern, the resulting structure is a simulated marble structure which more closely approximates the appearance of natural marble than other filled acrylics because the internal pigmentation as well as the surface pigmentation contributes to the marbleized effect. This is true even in highly filled and thin sections.

The use of alumina trihydrate as a filler in acrylic polymers produces a structure which is more resistant to staining by common household materials, particular acids and bases, than similar structures filled with calcium carbonate. As such, the structure is particularly useful as a kitchen or bathroom countertop.

The use of alumina trihydrate as a filler in acrylic polymers produces a structure that is highly flame resistant. This is particularly true when the filler level exceeds 55% by weight. It has been suggested that the use of alumina trihydrate as a filler in polyesters will produce the same result, but acrylic polymers are far more flammable than polyesters so the problem of reducing flammability in acrylic polymers is not equivalent to the problem of reducing flammability in polyesters. The use of alumina trihydrate in polyesters does reduce the flammability of such articles, but the evidence seems to be that the primary effect of the filler is to reduce the polymer fuel in the structure by replacing it with a non-flammable inorganic material, a result that could be achieved with any inorganic filler. There is a small reduction in flammability that can be directly attributed to the specific use of alumina trihydrate, but if this evidence is to be believed then it would be expected that to achieve a significant reduction in the flammability of the more highly flammable acrylic polymers, it would be necessary to use extremely high filler levels, and even then there is no reason to believe that the reduction would bring such structures into a range of flammability acceptable to the building industry. I have found that a significant reduction in the flammability of an acrylic structure can be achieved by using as little as about 55% by weight of alumina trihydrate as a filler. The reduction in flammability is measured by the Radian Panel Test (ASTM Test E–162–67) which is the measure of flammability currently being used by the building industry. As used in acrylic systems, then, it appears that the specific use of alumina trihydrate contributes directly to the large reduction in the flammability of acrylic systems which brings them into a range of flammability acceptable to the building industry.

Finally, the use of alumina trihydrate in acrylic systems produces a structure that is resistant to stress cracking. This feature manifests itself in two respects. First, there is a tendency for filled plastics to crack when subjected to a localized heat source, such as that represented by an oven burner in a countertop. The thermal conductivity of most filled plastics is not great enough to allow the heat to spread to more than a small region of the countertop, so the thermal expansion of the countertop is restricted to a small area and stress cracking has a tendency to occur. Alumina trihydrate filled acrylics have an increased thermal conductivity and because of this are expected to have an increased resistance to stress cracking. Second, attempts to cast filled plastics, particularly filled acrylics, in matched molds, have been generally unsuccessful, especially when the structure is not flat. Curved portions of the structure will catch on the mold, and the structure will crack, as it shrinks during polymerization. Alumina trihydrate filled acrylics have a higher strength and elongation than other filled acrylics. As a result of this, it appears to be possible to cast alumina trihydrate filled acrylics in matched molds. Because of this resistance to stress cracking, alumina trihydrate filled acrylic structures are particularly useful as kitchen countertops, particularly those with built-in sinks.

In addition, the improved building product of the present invention can be easily machined by conventional techniques.

The polymer constituent of the article discussed above can comprise any acrylic polymer, but preferably, it comprises a methyl methacrylate polymer such as methyl methacrylate homopolymers and copolymers of methyl methacrylate with other ethylenically unsaturated compounds (e.g., vinyl acetate, styrene, alkyl acrylates acrylonitrile, alkyl methacrylates, multifunctional acrylic monomers, such as alkylene dimethacrylates and alkylene diacrylates, etc.). In addition to acrylic polymer, the polymer constituent can contain small amounts of other polymers including minor amounts of polyester. The amount of non-acrylic polymer in the polymer constituent will depend on the intended uses of the structure but in all cases the polymer constituent should contain a major portion of acrylic components and in the preferred composition, it consists essentially of acrylic polymer with only small amounts of other polymers.

The improved product of the present invention can be produced by polymerizing a mixture containing 20 to 85%, preferably about 55 to about 80%, by weight of alumina trihydrate filler and 15 to 80%, preferably about 20 to about 45%, by weight of a polymer constituent, the major portion of which is a polymerizable acrylic composition. Preferably the polymeric composition consists essentially of polymerizable methyl methacrylate. The polymerizable methyl methacrylate can be methacrylate monomer alone or mixed with other $\alpha,\beta$-ethylenically unsaturated compounds or mixed with some preformed polymer. In a particularly useful process, the polymerizable composition is formed from a sirup containing about 10 to about 45% by weight of methyl methacrylate polymer dissolved in monomeric methyl methacrylate. The sirup can also include up to 20% by weight, preferably only a few percent, of ethylene dimethacrylate, as does the sirup described in U.S. Pat. 3,380,980.

A variety of specific curing steps can be used in the practice of the present invention. A particularly impressive curing process, from the standpoint of the time required for curing the article, is disclosed in copending U.S. application Ser. No. 197,974 for A Process for Curing Methyl Methacrylate in the Presence of Peroxy Catalysts, filed on Nov. 11, 1971, by R. B. Duggins. Prior to the discovery disclosed in this application, it was generally felt that the presence of water in a polymerizable methyl methacrylate composition would interfere with the polymerization. I discovered and disclosed in copending U.S. patent application Ser. No. 197,974 that under certain circumstances a small amount of water will actually promote polymerization. The circumstances under which this is true is the situation in which the water is part of an improved catalyst system, the nature of which is described in the above-identified application, the disclosure of which is hereby specifically incorporated into this application. Specifically, the catalyst comprises a small amount of a peroxy compound, preferably the hemiperester of maleic acid, or a metal salt thereof, and a small amount of a promoter for the peroxy compound. Preferably, the peroxy compound is water soluble and the solvent is water. The addition of a small amount of a chain transfer agent, such as a mercaptan chain transfer agent, is also beneficial. The generally accepted view that the addition of water to the polymerizing sirup decreases the polymerization rate is still correct in that when more than a small amount of water is used the polymerization rate decreases to the point where polymerization virtually stops. Within the limits found by applicant and disclosed in the above-identified application, however, the addition of water aids markedly in the polymerization.

Applicant has now found that alumina trihydrate can be used as an additive for a polymer of methyl methacrylate with the result that it acts to carry in the water needed to promote polymerization, and in addition produces a product with the beneficial and unexpected characteristics discussed above. It appears that the surface water carried by the alumina trihydrate contributes to the increased polymerization rate and the hydrated form of the water contributes to the unexpected product properties. It is not immediately apparent that the amount of water carried into the polymerization sirup by the alumina trihydrate would not be excessive to the point where the polymerization rate is reduced to an unacceptable level, but in fact the rate of polymerization is increased by the addition of the alumina trihydrate and under some circumstances (i.e., low humidity conditions) additional water must be added to the mixture to maximize the polymerization rate. Instead of being faced with the problem of slow polymerization, the opposite problem of too rapid polymerization can occur. Depending upon the constituents and configuration of the articles desired, extended mixing of the ingredients is necessary to obtain an integral mixture. If the catalyst is added to the initial mix, the surface water carried into the mix by the alumina trihydrate may cause polymerization to occur before the required amount of mixing is achieved. For this reason, it is often necessary to add the catalysts at the very last stage of mixing just before the mixture is cast into the desired form.

Another particularly impressive cure system, from the standpoint of the ability and ease with which thin and highly filled articles can be made, is disclosed in copending U.S. application Ser. No. 840,823 for a Process for Making Filled Methyl Methacrylate Articles, filed on Apr. 3, 1972.

BRIEF DESCRIPTION OF THE DRAWINGS

FIG. 1 is a plot of the flame spread index, as measured by the Radiant Panel Test on 65% by weight filled polymer compositions, as a function of the percent of alumina trihydrate in the filler;

FIG. 2 is a plot of the optical density (both flaming and smoldering) measured on 65% by weight filled polymer compositions, as a function of the percent of alumina trihydrate in the filler.

DISCUSSION OF THE PREFERRED EMBODIMENT

The filler used in the present invention is alumina trihydrate ($Al_2O_3 \cdot 3H_2O$), or as it is alternatively referred to aluminum trihydrate. It is present in concentrations of 20 to 85%, preferably 55 to 80%, by weight of the article. The amount added is not particularly critical. Above 85% by weight, however, the amount of polymer to act as binder drops to the point where the product is not particularly useful. Below about 20% by weight the effect of the filler, in terms of its contribution to the characteristics of the product, is not particularly noticeable, but some improvement is bound to occur. In general then, 20–85% additive should be used with the preferred range being 55–80% by weight. It should be understood, however, that inert fillers such as described in U.S. Pat. 3,405,088 can be used along with the alumina trihydrate additive. The form of the additive is generally particulate, and it should have a relatively small particle size. Aluminum trihydrate is sold by designation related to particle size, but the particles within a given grade or designation have a distribution of sizes. The size of the particles used as filler will affect the ability of the resin to wet the particles and the ease with which the mixture is cast or extruded. For these reasons, the particles used should preferably have a diameter ranging from about 0.1 to about 70.0 microns. Examples of alumina trihydrate grades (listed in order of decreasing size) with particles which fall substantially within this range are those sold under the designation C–33, C–30BF, and Hydral® 710 by the Alcoa Company. Unless some other means is used to control the viscosity of the mixture, it is desirable to use a mixture of such fillers. An example of such a mixture, chosen to provide a distribution of particle sizes suitable to maintain the viscosity of the mixture in this range is a mixture containing 75–90% C–30BF and 10–25% of Hydral® 710, both based on the total weight of the filler. Optionally, if some other means is used to thicken the resin, intermediate-sized particles (C–30BF) may be used as the only filler.

While any polymerizable acrylic composition can be used, the preferred polymer composition is a polymer-in-monomer sirup. The starting sirup for this polymer-in-monomer solution may be prepared by any of the methods described in British Pat. No. 870,191 or U.S. Pat. 3,154,600. Specifically, the sirup may be made by heating a small amount of a polymerization initiator in solution in the methacrylic ester and in the presence of a chain transfer agent at a suitable pressure and temperature. Heating is continued until the solution reaches a predetermined viscosity. Thereafter, the hot solution is quenched by the addition of cold monomer containing a polymerization inhibitor. More specifically, a sirup having a viscosity of 0.5–50 poises at 25° C. can be produced from methyl methacrylate by heating the monomeric methyl methacrylate in a jacketed kettle at a temperature of 50–150° C. under refluxing conditions. Atmospheric pressure is used and the refluxing material is stirred. Heating is conducted in the presence of a very small amount of initiator and from 0.05–1.0 mol percent of a chain transfer agent such as one of the alkyl mercaptans or the mercaptans described in U.S. Pat. 3,154,600. When a bulk viscosity in the range of 0.5 to 50 poises, which corresponds to an inherent viscosity of 0.25–1.0, is attained and the initiator content has been reduced substantially to zero, i.e., below 20 parts per million, the polymerization is stopped by cooling in any suitable manner. One method of cooling involves adding 1–10% by weight of cold methyl methacrylate containing sufficient hydroquinone or other polymerization inhibitor to inhibit further polymerization of the methyl methacrylate.

For the purpose of the present discussion, the final solution contains 10–45% by weight of the methyl methacrylate polymer dissolved in the methyl methacrylate monomer. The polymer has an inherent viscosity of 0.25–1.0 determined at 20° C. using a solution of 0.50 gram of the polymer per 100 milliliters of chloroform in accordance with the method described in F. W. Billmeyer, Textbook of Polymer Chemistry, Interscience Publishing Inc. (1957), page 128. As mentioned previously, the polymer may also be a copolymer involving a major portion of the methyl methacrylate monomer with other monomers such as vinyl acetate, styrene, methyl acrylate, ethyl acrylate, butyl acrylate, cyclohexyl acrylate, ethyl methacrylate, butyl methacrylate, cyclohexyl methacrylate, etc.

The polymerizable composition may also contain a cross-linking agent added to the sirup in an amount up to 20%, preferably 0.5 to 2.0%, by weight upon completion of quenching. Any suitable poly-unsaturated cross-linking agent may be used, e.g., ethylene glycol dimethacrylate, propylene glycol dimethacrylate, polyethylene glycol dimethacrylate, divinyl benzene, triallyl cyanurate, and diallyl phthalate. If desired, a portion, i.e., up to about 2% of the cross-linking agent, may be added to the preferred sirup composition prior to quenching.

Polymerization of the mixture can be accomplished by using any suitable initiator system such as from about 0.1 to about 2.0%, preferably about 0.6% of a conventional free radical initiator. Preferably the initiator is a peroxy compound or an azo compound. Lauroyl peroxide, benzoyl peroxide, t-butyl perbenzoate, t-butyl peroxypivalate, t-butyl peroxymaleic acid and $\alpha,\alpha'$-bisisobutyronitrile are examples of such initiators. A particularly rapid cure system is described in U.S. patent application Ser. No. 197,974, the disclosure of which is hereby incorporated by reference into the present disclosure, for a Process for Curing Methyl Methacrylate in the Presence of Peroxy Catalysts, filed on Nov. 11, 1971, by R. B. Duggins. This process involves adding to the polymerization constituent, preferably the polymer-in-monomer sirup discussed above, a peroxy compound, a small amount of a chain transfer agent and 0.05 to 5.0 parts per hundred, based on the weight of the polymerizable material, of water as a promoter for the peroxy compound. The peroxy compound is preferably a hemiperester of maleic acid, e.g., mono-tertiary-butyl peroxy-maleate sometimes referred to as t-butyl peroxy maleic acid, in combination with a basic compound of the desired metal. As such basic compounds, one may use any metal compound that will react with the acid substitute of the hemiperester to form the metal salt of the hemiperester. Although it is most practical to add the basic compound after first dissolving the hemiperester of maleic acid in the polymer-in-monomer sirup, it is not essential. In fact, a very useful mode of conducting the process involves the dissolution of the hemiperester in one portion of the sirup and the suspension of the basic compound in another portion of the sirup. As long as the two portions are kept separate, they each will have relatively long pot lives. However, when they are mixed or fed as two streams into a common container, rapid curing results. The curing may be accomplished autogenically by merely exposing the sirup containing the metal salt of the hemiperester of maleic acid to a temperature of 15–40° C. Although elevated temperatures and higher pressures may be used, they are not necessary with this cure system.

The mixture can be cast or extruded onto a casting surface which can be adapted to allow the mixture to cure autogenically or can be part of a compression mold so that the mixture can be subjected to a pressure of about 15 to about 1,500 p.s.i. and a temperature of about 30° C. to about 130° C. for a time sufficient to cure the mixture.

If the mixture is molded, the use of up to 5.0%, preferably about 0.1%, of a mold release agent such as zinc stearate of "Zelec"* UN lubricant is helpful.

The viscosity of the polymerizable mixture will affect the final product and the process for its manufacture. If the viscosity is too low, for example, the polymerization rate is decreased. If the viscosity is too high, the mixture is difficult to stir and it is difficult to achieve high filler loading. i.e., above and 65% by weight of filler. Not only is processing difficult, but the physical properties of the final product can be decreased. This is particularly true with thin structures, i.e., those having a thickness below half an inch. Control of the viscosity is one of the reasons why in the preferred embodiment, the diameter of the filler is in the range of 0.1 to 70.0 microns. Even in this range, some other means to decrease the viscosity of the mixture is desirable. One particularly useful method of reducing the viscosity is the process described in U.S. patent application Ser. No. 840,823, the disclosure of which is hereby incorporated by reference into the present discussion. This process involves the use of up to about 2.0%, preferably 0.1%, by weight of an acid, or an acid derivative, viscosity modifier to decrease the viscosity of the mixture and facilitate mixing of the ingredients and handling of the mixture. Any moderate length aliphatic monoacid having 6–20 carbon atoms or monoesters of diacids in which the acid precursor has 4–20 carbon atoms will produce some re-

*Registered trademark of the E. I. du Pont de Nemours & Co.

duction in viscosity. The preferred materials are Zelec® UN lubricant, Zelec® (NE or NK) antistatic agents (all of which are fatty alcohol phosphate compositions which are mono or dialkyl esters of ortho phosphoric acid), "Aerosol"** OT surface active agent, octanoic acid, hexanoic acid, decanoic acid, dichloroacetic acid, monoesters of dicarboxylic acids such as t-butyl peroxymaleic acid, monomethyl adipate, monomethyl maleate, monomethyl fumarate, monomethyl glutarate, monomethyl succinate, and the monoethyl ester of maleic acid. When Zelec® UN lubricant is used, the material functions both as a mold release and as a viscosity modifier.

The mixture of the present invention may be used to fabricate all types of polymeric articles. Thus, the mixture may be poured on a corrugated surface to produce sheets. The mixture may be poured into molds. The term "pouring the mixture onto a casting surface" is meant to include all varieties of the procedures discussed above or known to those skilled in the art. Two procedures useful in formulating articles are described in U.S. Pat. 3,488,246 issued to R. B. Duggins and entitled Cast Plastic Simulated Building Product, and U.S. Pat. No. 3,642,975 issued to R. B. Duggins and R. J. Gross.

The important improvements obtained by the present invention will be more clearly understood by referring to the examples discussed below.

EXAMPLE 1

Alumina trihydrate, 60% by weight, was mixed with 40% by weight of poly methyl methacrylate (30% homopolymer-in-monomer) sirup at a temperature of 27–29° C. The sirup also contained a small amount of ethylene dimethacrylate. A paste, containing calcium hydroxide, poly methyl methacrylate sirup, and a small amount of water was then added to the above mixture so that the mixture contained 0.65 p.p.h. (based on the weight of allowed to stand for 16 hours. The effect after this time was observed visually. The flame spread index was initially measured ASTM Test E-162-60 entitled, "Surface Flammability of Materials Using a Radiant Heat Energy Source," and commonly referred to as the Radiant Panel Test, and then several samples were subjected to ASTM Test E-84-61, entitled "Surface Burning Characteristics of Building Apparatus" and commonly referred to as the Steiner Tunnel Test. All the samples were not subjected to the Steiner Tunnel Test because of the difficulty and expense of producing the large panels needed for the test. The only important sample that was not subjected to the Steiner Tunnel Test, however, was Control B, and based on the other results it is believed that its Steiner flame spread index would be greater than or equal to 56 (the radiant panel value) times 110/79 (the ratio of Steiner Tunnel to Radiant Panel value for the smaller of the other two samples); or greater than or equal to 79.

It will be noted that all the structures containing alumina or alumina trihydrate are unaffected by the vinegar, but the samples containing calcium carbonate have been etched by the vinegar. It should also be noted that all the samples containing alumina or alumina trihydrate have flame spread indexes less than those containing calcium carbonate, and that those containing alumina trihydrate have a flame spread index far less than all the others. In fact, the samples containing alumina trihydrate are the only ones that will pass the government standard (Steiner Tunnel Flame Spread Index of less than 75) applied to materials used in hospitals. All of the samples listed had a light smoke appearance and low fuel contribution, but the alumina trihydrate samples were noticeably superior in this regard as well. Finally, when held up to the light, the samples made with calcium carbonate and "alumina" were opaque, while those made with alumina trihydrate were translucent.

TABLE I

| Example or control [1] | Filler | Percent filler by— | | Vinegar stain test* | Flame spread index | | Smoke appearance |
|---|---|---|---|---|---|---|---|
| | | Weight | Volume | | Radiant panel | Steiner tunnel | |
| A | $CaCO_3$ | 60 | 38.4 | AE | 79 | 110 | Light. |
| B | $Al_2O_3$ | 60 | 30.7 | NA | 56 | **≥79 | Do. |
| 1 | $(Al_2O_3 \cdot 3H_2O)$ | 60 | 41.0 | NA | 18 | 45 | Do. |
| C | $CaCO_3$ | 60 | 38.4 | AE | 79 | 110 | Do. |
| D | $Al_2O_3$ | 66.9 | 38.4 | NA | 40 | | Do. |
| 2 | $(Al_2O_3 \cdot 3H_2O)$ | 57.4 | 38.4 | NA | 24 | | Do. |

[1] Control A and Control C are identical samples.
*AE=Acid etched; NA=Not affected.
**Estimated (see discussion).

the sirup) calcium hydroxide and 0.2 p.p.h. of water. Finally 0.2 p.p.h. of glycol dimercaptoacetate and 2.0 p.p.h. of tert-butyl peroxy maleic acid were added to the mixture. The resulting mixture was poured into a container to form layers of approximately ½" thickness and allowed to cure.

Two controls were made using the same procedure and percentage of filler. In Control A the filler was calcium carbonate, in Control B it was calcined "alumina."

EXAMPLE 2

A second article was prepared using the same procedure used to produce the article of Example 1, except that the percentage of filler was 38.4% by volume. Two controls using the same percentage of filler were prepared in a similar manner; Control C containing calcium carbonate, and Control D containing alumina. (Control C being identical with Control A.)

The samples were then subjected to various stain or etching tests and flammability tests. In Table I the results of a vinegar stain test (to represent the type of acid commonly present in the kitchen) and flammability tests are tabulated. To measure the effect of vinegar on the sample, 2 or 3 drops of vinegar were placed on the sample and

**Registered trademark of the American Cyanamid Co.

EXAMPLES 3–5

A sirup of about 23% by weight of methyl methacrylate homopolymer dissolved in methyl methacrylate monomer is prepared by partial polymerization in situ and about 1.25% ethylene dimethacrylate is added to the mixture. The composition is designated Sirup. To this sirup are added t-butyl peroxymaleic acid (PMA), $Ca(OH)_2$, ethylene glycol dimercaptoacetate (GDMA) and various fillers in the amounts shown in pph in Table II. (The alumina trihydrate used was C-33 grade.)

TABLE II

| | Example 3 | Example 4 | Example 5 | Control F |
|---|---|---|---|---|
| Sirup | 33.2 | 33.2 | 33.2 | 33.2 |
| PMA* | 0.5 | 0.5 | 0.5 | 0.5 |
| $Ca(OH)_2$* | 0.7 | 0.7 | 0.7 | 0.7 |
| GDMA* | 0.25 | 0.25 | 0.25 | 0.25 |
| $Al_2O_3$ | 20 | 10 | 0 | 0 |
| $CaCO_3$ | 0 | 0 | 0 | 65 |
| $Al_2O_3 \cdot 3H_2O$ | 45 | 55 | 65 | 0 |

*Approximate percent based on the weight of the sirup.

A small amount water, less than about 1.0%, is present in each mix to increase the rate of polymerization.

Control samples (Control E) consist of 100% polymethyl methacrylate were purchased. These samples were Plexiglas®.

The mixture was poured into a mold and cured autogenically to form ½" sheets. Comparable ⅛" sheets were also made.

Control samples were then made from Reichhold Polylite® polyester 32–129 which contained comparable amounts of filler as shown in Table III.

TABLE III

| Control | G | H | I | J | K |
|---|---|---|---|---|---|
| Polyester | 35 | 35 | 35 | 35 | 35 |
| $Al_2O_3$ | 20 | 10 | 0 | 0 | 0 |
| $CaCO_3$ | 0 | 0 | 0 | 0 | 65 |
| $Al_2O_3 \cdot 3H_2O$ | 45 | 55 | 65 | 0 | 0 |

To the above mixture, 1.0% by weight based on the weight of the polyester, a methyl ethyl ketone peroxide (Lupersol DDM®) was added to catalyze the mix.

The flammability of these structures was measured on ¼" samples using the Radiant Panel Test (ASTM Test E-162-67). Flammability was also measured on ⅛" samples using ASTM Test D-2863-70 entitled "Flammability of Plastics Using the Oxygen Index Method" commonly referred to as the Oxygen Index Test. The smoke generated (both when the structures were smoldering and flaming) was also measured according to a method described by Gross, Loftus and Robertson, "Method for Measuring Smoke From Burning Materials," ASTM STP-422 (1966).

Table IV shows how the flammability of the various examples and controls (including some from Examples 1 and 2) vary with the amount and type of filler used. It should be noted that the flame spread index shows the 100% acrylic sample is far more flammable than the 100% polyester sample. The Oxygen Index Test does not confirm this, but the Oxygen Index is not as reliable an index of flammability in building products as the Radiant Panel Test. It should also be noted that the use of alumina trihydrate as a filler in polymethyl methacrylate produces a structure which is far more flame resistant at all filler levels than a comparable structure containing $CaCO_3$ as a filler.

TABLE IV

| Example or Control | Percent polymer | | Percent filler | | | Flame spread index | Oxygen index |
|---|---|---|---|---|---|---|---|
| | Acrylic | Polyester | $Al_2O_3 \cdot 3H_2O$ | $Al_2O_3$ | $CaCO_3$ | | |
| E | 100 | 0 | 0 | 0 | 0 | 410 | 19.4 |
| 2 | 42.6 | 0 | 57.4 | 0 | 0 | 24 | -------- |
| 1 | 40 | 0 | 60.0 | 0 | 0 | 18 | -------- |
| 5 | 35 | 0 | 65 | 0 | 0 | 14 | 33.6 |
| E | 100 | 0 | 0 | 0 | 0 | 410 | 19.4 |
| A | 40 | 0 | 0 | 0 | 60 | 79 | -------- |
| F | 35 | 0 | 0 | 0 | 65 | 68 | 19.9 |
| J | 0 | 100 | 0 | 0 | 0 | 233 | 19.9 |
| I | 0 | 35 | 65 | 0 | 0 | 14 | 30.6 |
| K | 0 | 35 | 0 | 0 | 65 | 19 | 21.2 |

Table V shows how the flammability of a 65% filled polymer varies with the percentage of alumina trihydrate used in the filler. Both acrylic and polyester structures are compared. Alumina ($Al_2O_3$) is used as an inert filler to allow this comparison without changing the amount of polymer fuel available. FIG. 1 is a plot of the flame spread index versus the percent of alumina trihydrate in the filler. It should be noted that the percentage of alumina trihydrate in the filled polyester structure does not alter the flammability drastically, at least until higher filler levels, but the percentage of alumina trihydrate in acrylic structures has a drastic effect on its flammability at all filler levels. This indicates that almost any filler will act to reduce the flammability of a polyester structure to an acceptable level, by merely displacing polymer, but that the use of alumina trihydrate specifically causes the reduction in flammability observed in acrylic systems.

TABLE V

| Example or control | Percent polymer | | Percent filler | | | Flame spread index | Smoke test | | Oxygen index |
|---|---|---|---|---|---|---|---|---|---|
| | | | | | | | Smoldering optical density (corr.) | Flaming optical density (corr.) | |
| | Acrylic | Polyester | $Al_2O_3 \cdot 3H_2O$ | $Al_2O_3$ | $CaCO_3$ | | | | |
| 3 | 35 | 0 | 45 | 20 | 0 | 24 | 33 | 7 | -------- |
| 4 | 35 | 0 | 55 | 10 | 0 | 21 | 29 | 9 | 31.8 |
| 5 | 35 | 0 | 65 | 0 | 0 | 14 | 18 | 7 | 33.6 |
| F | 35 | 0 | 0 | 0 | 65 | 68 | 47 | 1 | 19.9 |
| G | 0 | 35 | 45 | 20 | 0 | 18 | 323 | 139 | -------- |
| H | 0 | 35 | 55 | 10 | 0 | 18 | 316 | 150 | -------- |
| I | 0 | 35 | 65 | 0 | 0 | 14 | 279 | 112 | 30.6 |
| K | 0 | 35 | 0 | 0 | 65 | 19 | 373 | 118 | 21.2 |

FIG. 2 compares the smoke generated in filled polyester and acrylic systems as a function of the amount of alumina trihydrate in the filler. The acrylic system generates far less smoke. This factor is important in its acceptance as a building product.

The tensile and flexural properties of selected acrylic samples were measured using the ASTM D-638 and ASTM D-790 tests respectively. The thermal conductivity of these samples was also measured at various temperatures. These values are shown in Table VI.

TABLE VI

| Example or Control | Percent acrylic polymer | Percent filler | | Thermal conductivity | | Tensile properties | | | Flexural prop. | |
|---|---|---|---|---|---|---|---|---|---|---|
| | | $Al_2O_3 \cdot 3H_2O$ | $CaCO_3$ | Temp., °C. | K* | Strength, p.s.i. | Elongation, percent | Modulus, p.s.i. $\times 10^5$ | Strength, p.s.i. | Modulus, p.s.i. $\times 10^5$ |
| 5 | 35 | 65 | 0 | 25 / 94 / 121 | -------- / 1.97 / 1.89 | 2,627 | 0.35 | 8.86 | 3,983 | 8.8 |
| F | 35 | 0 | 65 | 25 / 94 / 121 | -------- / 1.36 / 1.36 | 1,986 | 0.22 | 10.81 | 3,828 | 10.74 |

*Units—cal.-cm./sec./° C./cm.² $\times 10^{-3}$.

It should be noted that the strength and modulus (both tensile and flexural) and the tensile elongation of alumina trihydrate filled samples are superior to those of the calcium carbonate filled samples. This would account for the ability to cast alumina trihydrate filled samples but not $CaCO_3$ filled samples in matched molds. The thermal conductivity of the alumina trihydrate filled samples is also greater than that of the CaCO₃ filled sample, and this is expected to give rise to a higher resistance to thermal cracking.

Finally the stain resistance of the samples was measured. A few drops of a variety of materials (designated 1 to 11) was placed on the sample and covered with a watch glass. After 16 hours, an attempt was made to remove any stain left by the material. First, the sample was scrubbed 20 times with water-wet cheese cloth, using normal hand pressure, rinsed with water and dried. If there was no visible stain, the sample was rated 1. If the stain remained, the sample was then scrubbed 20 times with alcohol-wet cheese cloth, rinsed, dried and examined. If there was no stain it was rated 2. If the stain persisted, the sample was scrubbed 20 times with Bon Ami® on wet cheese cloth, rinsed and examined. If the stain was gone, the sample was rated 3. This was followed by 40 additional strokes with Bon Ami® on wet cheese cloth. If the stain was gone, the sample was rated 4, if not it was rated 5. A review of Table VII indicates that the alumina trihydrate filled acrylic was far more stain resistant than calcium carbonate filled acrylics.

TABLE VII

| Example or control | Percent polymer (acrylic) | Percent filler | | Stain rating for test— | | | | | | | | | | |
|---|---|---|---|---|---|---|---|---|---|---|---|---|---|---|
| | | Al₂O₃·3H₂O | CaCO₃ | 1 | 2 | 3 | 4 | 5 | 6 | 7 | 8 | 9 | 10 | 11 |
| E | 100 | 0 | 0 | 1 | 1 | 1 | 1 | 1 | 1 | 1 | 1 | 1 | 5 | 5 |
| 5 | 35 | 65 | 0 | 1 | 1 | 1 | 2 | 2 | 2 | 3 | 1 | 4 | 4 | 4 |
| F | 35 | 0 | 65 | 5 | 1 | 1 | 3 | 2 | 5 | 5 | 3 | 2 | 5 | 5 |

See the following:

| Test | Material | Test | Material |
|---|---|---|---|
| 1 | 10% aqueous HCl. | 7 | 1% tincture of iodine. |
| 2 | 10% aqueous NH₄OH. | 8 | Water-washable ink. |
| 3 | Blood. | 9 | Nail polish remover. |
| 4 | Hair dye. | 10 | Methyl ethyl ketone. |
| 5 | Shoe polish. | 11 | Acetone. |
| 6 | Gentian violet. | | |

EXAMPLE 6

To the strip of Examples 3–5, 0.5% of t-butyl peroxymaleic acid, 0.25% of GDMA, 0.25% of Ca(OH₂)₂, all based on the weight of the strip, were added. Then 40 parts of this mixture and 60 parts of C–331 alumina trihydrate were mixed together. The samples gelled and cured almost immediately after mixing in the filler and placing the samples under a vacuum.

What is claimed is:

1. In a simulated marble article formed from: a first material comprising a first polymer of methyl methacrylate in which is distributed and suspended at least one relatively smaller elongated substantially continuous coherent, independent mass of a second material comprising a polymer of methyl methacrylate and having a pigmentation differing from that of said first material, said smaller mass being disposed in a predetermined, repetitive, reproducible, irregular, three-dimensional configuration throughout said article, and between 20–85% by weight of an inorganic additive; the improvement wherein said inorganic additive is alumina trihydrate and said article is translucent to the point where differences in pigmentation other than differences in pigmentation on the surface of said article are apparent and contribute to the marbleizing effect.

References Cited
UNITED STATES PATENTS

| 3,706,696 | 12/1972 | Bernett | 260—29.6 R |
| 3,405,088 | 10/1968 | Slocum | 260—41 |
| 3,563,939 | 2/1971 | Stevens | 260—37 |

MORRIS LIEBMAN, Primary Examiner

P. R. MICHL, Assistant Examiner